United States Patent [19]

De Jeney

[11] 4,312,576

[45] Jan. 26, 1982

[54] DRIVING DEVICE FOR THE ELIMINATION OF THE USE OF PERFORATIONS FOR DRIVING THE FILM OF MOVIE CAMERAS, PROJECTORS AND EDITORS WITH OPTICAL COMPENSATOR

[76] Inventor: Viktor De Jeney, 6323 64th Ave., Riverdale, Md. 20840

[21] Appl. No.: 74,068

[22] Filed: Sep. 10, 1979

Related U.S. Application Data

[63] Continuation-in-part of Ser. No. 12,373, Feb. 15, 1979, abandoned.

[51] Int. Cl.³ .............................................. G03B 41/04
[52] U.S. Cl. ..................................... 352/119; 352/14; 352/21; 242/203
[58] Field of Search .................... 352/113, 119, 21, 14; 242/203

[56] References Cited

U.S. PATENT DOCUMENTS

| | | | |
|---|---|---|---|
| 2,243,112 | 5/1941 | Morrissey | 352/14 |
| 2,297,222 | 9/1942 | Kemna | 352/119 |
| 2,449,705 | 9/1948 | Jones | 352/119 |
| 2,487,476 | 11/1949 | Pratt et al. | 242/203 |
| 3,045,937 | 7/1962 | Johnson | 242/203 |
| 3,141,626 | 7/1964 | Hoskin | 242/203 |
| 3,244,469 | 4/1966 | Hennessey | 352/14 |
| 3,262,750 | 7/1966 | Bottani | 352/119 |
| 4,050,794 | 9/1977 | Shields | 352/21 |

Primary Examiner—Monroe H. Hayes

[57] ABSTRACT

A driving device which enables the use of films with or without perforations and the driving of a perforated film without using the perforations and sprockets in movie projectors and editors with optical compensator and steady flow of the film, and any other device where the film between the two reels is driven conventionally with a perforation-sprocket system.

1 Claim, 3 Drawing Figures

4,312,576

DRIVING DEVICE FOR THE ELIMINATION OF THE USE OF PERFORATIONS FOR DRIVING THE FILM OF MOVIE CAMERAS, PROJECTORS AND EDITORS WITH OPTICAL COMPENSATOR

CROSS-REFERENCE TO OTHER APPLICATION

This application is a continuation-in-part of my co-pending application Ser. No. 12,373 filed Feb. 15, 1979, now abandoned.

FIELD OF THE INVENTION

The present invention relates generally to a driving mechanism which makes possible to avoid using the sprocket and perforation for the driving of information carrier strips, such as films, through a projector or editor.

BACKGROUND OF THE INVENTION

In existing devices, to carry the film in use, two reels, a supply reel and a take up reel were employed. The film was wound off from the supply reel, passed through the projector system and wound up on the take up reel or rewound. As during such unreeling, the diameter of the film roll on the supply reel continuously decreased and on the take up reel continuously increased, the driving of the reels and thereby driving of the film strip through the shafts of the reels would have created a continuous change in the speed of the film. For that reason, in projectors or editors, the film had to be driven by a sprocket, the teeth of which fitted into the perforation of the film. The sprocket was driven by an independent power source, usually a reversible electric motor. The reels were driven independently from each other mostly through a spring belt and a clutch to create some slipping in the film to avoid too much tension.

In such devices, the film was dragged from the supply reel by a sprocket, through the perforations. A disadvantage of such prior system was that the film became easily damaged at the perforations and that the perforation in the film enlarged necessarily the width of the film by approximately ⅛ of its size. Besides this disadvantage, the prior art devices experienced difficulties especially in projectors with interrupted motion of the film, where the film strip passing through the projector window was driven with a jerking motion but the part of the film which passed through the sound reproducing system had to be driven with a steady flowing motion.

To solve this problem, three sprockets had to be used from which two sprockets played the role of a buffer to separate the jerking motion from the steady flowing part of the film.

The introduction of the optical compensators (prisms, etc.), in the field of projectors, however, opened the door to the use of a different driving system, making possible the elimination of the driving of the film through the perforation-sprocket system.

SUMMARY OF THE INVENTION

It is, therefore, the object of this invention to provide a driving system for films in movie projectors, editors, where the film is driven, instead of the conventional sprocket and perforations, through the shafts of the reels by two identical reversible variable speed electric motors, connected in series, rotating in the same direction, driven in a manner which is contrary to the changing diameter of the film roll, providing thereby a steady uniform flow of the film.

A further object of this invention is to use a sprocket during the projection of a film with perforations for synchronizing the motion of the film with the rotation of the prism by letting the film drive the sprocket, which is connected through a timing belt to the prism.

A further object of the invention is to make possible the use of a film without perforations in the projector by synchronizing the film with the prism instead of the sprocket, through a metal roller which has a circumference which is the multiple number of the height of one picture frame of the film.

Still a further object of this invention is to maintain a proper tension in the film during operation through the automatic change of the speed of the motors by a stress control device which comprises two conductors which are connected to the circuit of the motors before and after each motor with a rheostat in it which, by changing the resistance, varies the speed of the motor. The arm of the rheostat is connected to an arm with two rollers which are leading the film between the reel and the projection system. The arm is moved by the tension or slack of the film thereby changing the resistance in the rheostat and so the speed of the motor.

The invention makes it possible to avoid using the sprocket and perforation for the driving of the film by driving it through the shafts of the reels by utilizing the series connection effect in two reversible variable speed motors, more specifically, two series wound 125 VAC 60 Hz, or non-synchronous high slip 125 VAC 60 Hz or PM field 12-24-VDC 1.66 amps or shunt wound 28 VDC 3.1 amps, gear reduced to 300 RPM. The motors are mounted on the shafts of the reels, and driving them in a manner which is contrary to the decreasing and increasing diameter of the supply and take up reel rolls. This is achieved if two of said electric motors with variable speed are connected in series in the same circuit, driven in the same direction and the supply reel motor is slowed down relative to the take up reel motor, creating a certain tension in the film between the two reels.

In the energizing circuit of the two motors a manually operated speed control device is installed through which the total speed of the gear reduced motors can be varied between 0 and 300 RPM.

During projection, because the supply reel motor will be driven slower, using less energy from the energy supplied, the take up reel motor will be driven faster, using up the rest of the energy supplied. This means that the speed of the supply reel motor will always control the speed of the take up reel motor due to the series connected effect.

When the total speed of the two motors is set through the speed control device for 40 RPM, the amount of energy, divided between the two motors, connected in series, will drive each of them with 20—20 RPM, assuming that the two motors have an equal load. But if one of the motors is slowed down by some means and the motor will turn slower, then the other motor will be driven that much faster by how much the first is slowed down.

To slow down one motor with respect to the other, a parallel conductor is installed in the circuit beside each of the motors with a rheostat (speed control) in it which serves as a stress control device. The arm of the rheostat is connected with an arm which has two rollers leading the film between the respective reel and the projection system. If the tension is too much the film moves the arm and raises the resistance in the rheostat, feeding thereby more energy to the motor, raising thereby the speed of the motor and lowering the tension in the film.

If there is too much slack in the film, the control arm forced by a spring toward the film will move in the opposite direction, lowering the resistance in the rheostat, lowering thereby the tension in the film.

The parallel conductor can be disconnected through a switch from the energy circuit deactivating this way the stress control device.

One stress control device is installed between the supply reel and the projection system, the other between the projection system and the take up reel.

During projection, the stress control device between the supply reel and projection system must be activated and the other deactivated. During rewinding the opposite occurs.

A third motor is placed on the path of the film between the two reels and is driving the two metal rollers before and after the sound drum at a preset constant speed, which can be changed, if a slower speed of the film is desired, through the speed control device which is installed in the energy supply circuit of the motor. It is understandable that instead of the metal rollers, other suitable material can be used, for example, hard rubber, etc.

The motors on the supply and take up reel shafts are driven by the same current source, the third motor is driven by an independent current source.

The two metal rollers are replacing the film driving sprockets according to one aspect of the present invention in order to eliminate the driving of the film through the perforations. They are placed in the path of the film before and after the sound drum. The two metal rollers are each coupled with two rubber rollers and are connected with each other through a gear train or timing belt, rotating in the same direction. One of the metal rollers is driven by the third motor which is controlled by a variable speeed control device. The circumference of the metal rollers has to be equal to a number which is an even multiple of the height of one picture frame of the film and adjusted to the number of faces of the prism used as an optical compensator, in order to be able to synchronize the motion of the film with the rotation of the prism. If using a film with perforations in the projector, the synchronization of the motion of the film with the rotation of the prism can be done through a sprocket with teeth fitted into the perforations of the film, connected through a gear and timing belt to the gear on the prism of the projection system by still using the metal rollers for the driving of the film.

More detailed explanation will be apparent from the drawings and description.

Because the projector system is discussed in detail in the description of that patent, here only the driving system will be discussed.

Figure 2:
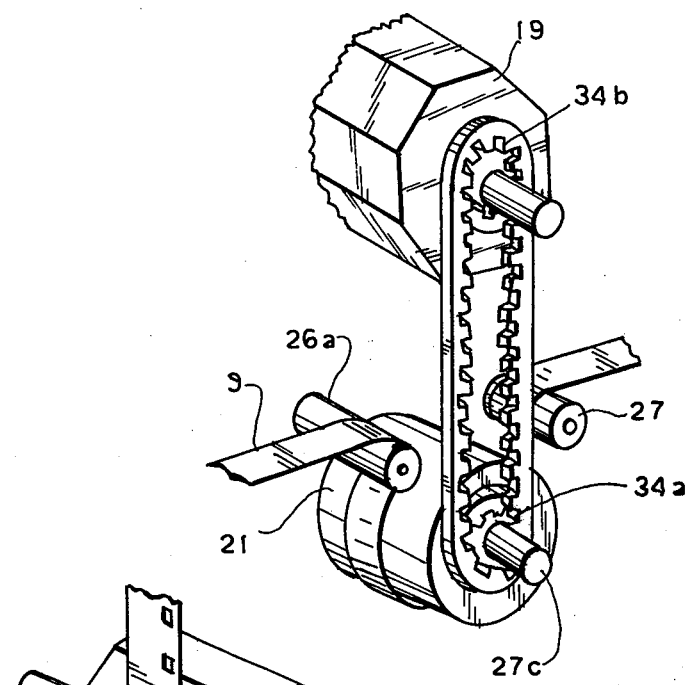

FIG. 2 shows the way of synchronization through one of the metal rollers and the neighboring rubber rollers driven by the third motor and the connection between the prism and the metal roller when using a film without perforations in the projector.

Figure 3:
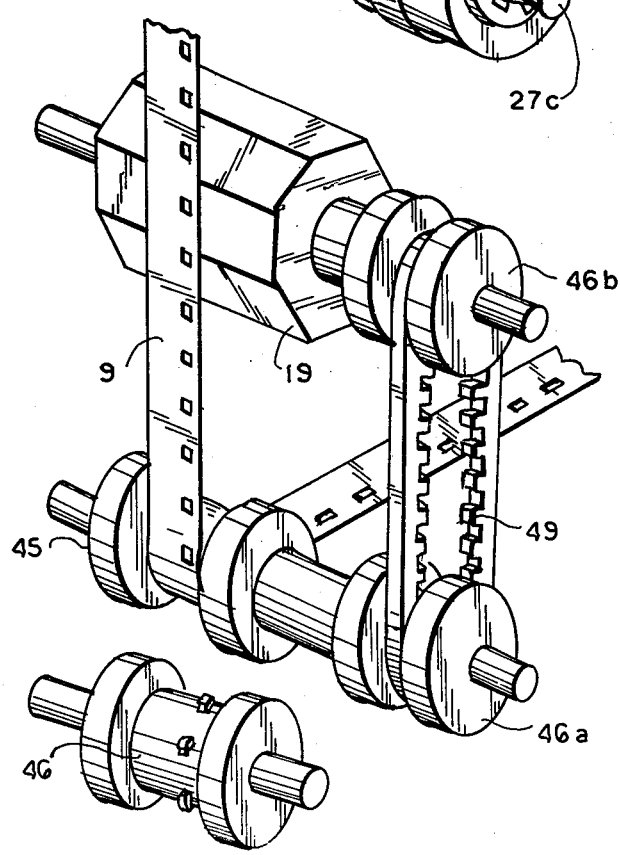

FIG. 3 shows the way of synchronization of the film and the prism through a sprocket for films with perforations.

DESCRIPTION OF THE PREFERRED EMBODIMENTS

Figure 1:
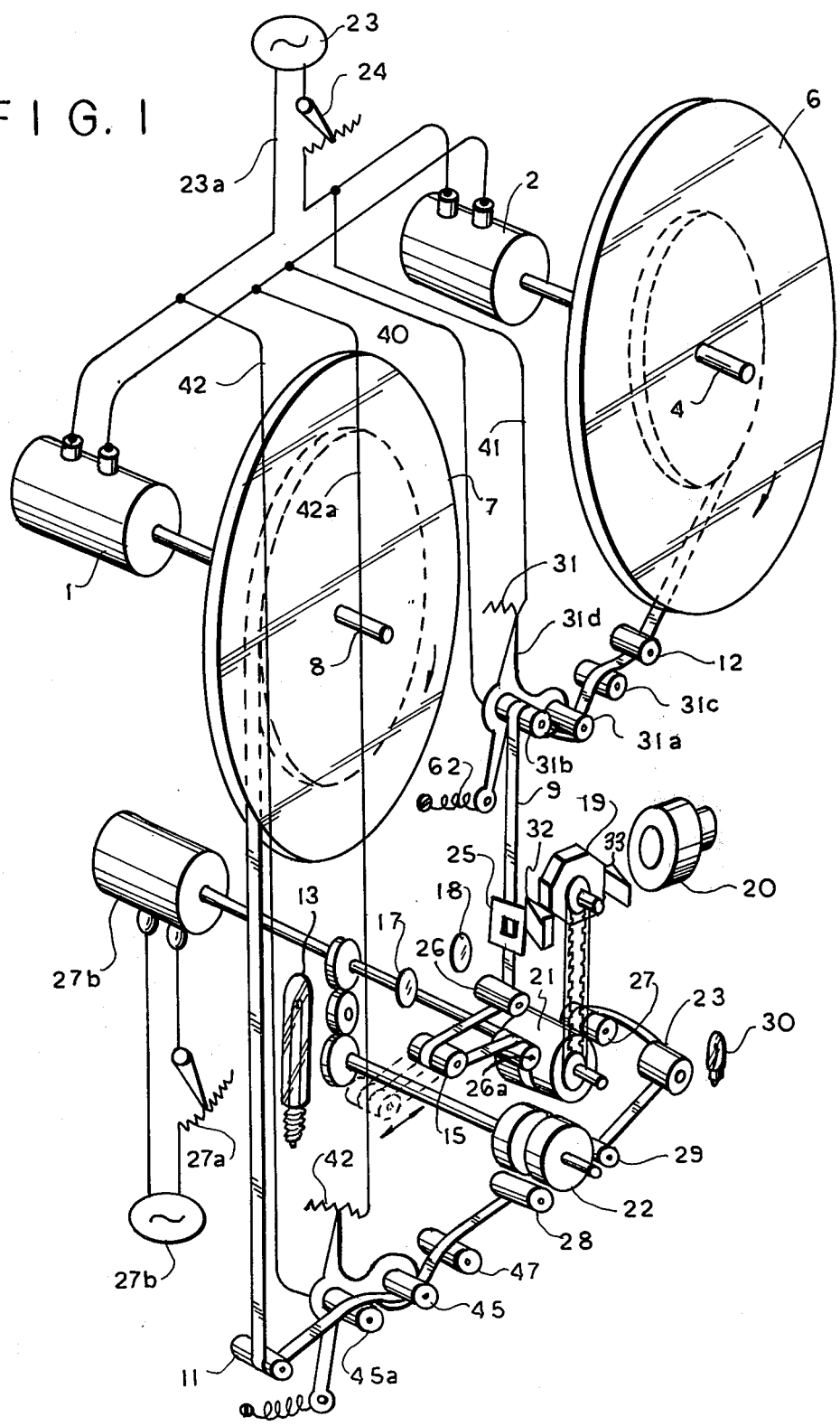
FIG. 1 illustrates the general concept of the electrical driving system and the elimination of the use of the perforation for the driving of the film shown by way of example, as incorporated in my movie projector with optical compensator (U.S. Pat. No. 3,563,643), and the stress control device.

Referring now to FIG. 1, it is shown that reversible gear reduced electric motors 1 and 2 are mounted on the shafts 4 and 8, of supply reel 6 and take up reel 7.

Motors 1 and 2 are connected in series to be energized by electric current source 23. A manually operated variable speed control device 24 is placed into the circuit 23a, to regulate the total speed of the motors 1 and 2. Film 9 as unwound from supply reel 6 is wound onto take up reel 7 and moves through the projector system which in a combination comprises a projector window 25, guide rollers 12, 31, 26, 15, 11, a prism 19, a lamp 13, condensor lenses 17, 18, projector lens system 20, motor 27b, metal rollers 21, 22, sound drum 23, rubber rollers 26a, 27, 28, 29 and optical wedges 32 and 33. In the stress control device rollers 31c, 31a, 31b, rheostat 31, rollers 47, 45, 45a, rheostat 42 are provided.

In operation, the supply reel motor 2 and the take up reel motor 1 will rotate in the same direction. The amount of energy supplied to the two motors, called in the future the total energy supply, is regulated by the variable speed control device 24. Due to the series connected effect, the total energy will be divided between the two motors so that if the total energy would drive one motor with 40 RPM, the two motors will be driven with an equal load, with 20—20 RPM each.

When, for example, a 36 cm diameter film roll of a 16 mm projector is placed on the supply reel, the total speed for the two motors will be manually set on the speed control device 24 for 35.9 RPM.

When motors 1 and 2 are energized, they would tend to move with the same speed but because motor 2, which drives the supply reel is slowed down by the stress control device, motor 1 will be driven faster, due to the series connection effect and will tighten the film between the reels.

The tension created this way in the film is set and kept by the stress control device.

As a result, reel 6 will move only as fast as much rotation is needed to feed the necessary amount of film, to take up reel 7, which will be in the case of a 36 cm diameter film in a 16 mm projector approximately 8.9 RPM. This will be apparent from calculations shown later. Consequently, motor 2 will use up only so much energy from the total energy supplied by the speed control device 24 and, the rest will be used by motor 1, which drives the take up reel. This means 35.9−8.9=27 RPM.

The stress in the film can be regulated by setting the spring of the stress control device tighter or looser.

During operation, the circumference of the film roll on the supply reel 6 will become gradually smaller and the speed of the reel will increase, using up more from the energy supply and slowing down motor 1, which drives the take up reel.

This way actually the speed of the two motors 1 and 2 will be controlled by each other and the film between the two reels will have a steady uniform speed.

When the film has to be rewound, the stress control device which controls the supply reel has to be deactivated and the stress control device which controls the take up reel has to be activated.

Because the speed of the film has to be approximately 24 frames per second, the total speed of the two motors should be set by the speed control device 24 according to the diameter of the film in use, in advance.

Different diameter film rolls will have a different total speed. A 36 cm diameter film roll, in a 16 mm projector has, for instance, 161 picture frames in the circumference of the roll.

Assuming that the speed of the film has to be 24 picture frames per second, the necessary starting speed of the two reels can be calculated.

The following chart shows a calculation of the total and individual speed of the film rolls in a 16 mm projector.

The chart shows that the total speed of a 36 cm diameter film roll is 35.9 R.P.M. For a 30 cm diameter film roll is 37 R.P.M., etc.

CALCULATION OF THE TOTAL SPEED OF DIFFERENT SIZE ROLLS IN A 16 M/M PROJECTOR

| Size of film rolls | | R.P.S. | | RPM of the take up roll at start | Total speed of the different size rolls |
|---|---|---|---|---|---|
| Diam. in cm. | Circum- ference in cm. | No. of Frames in the Circumf. | of one rev. R.P.M. of the supply roll at start | | |
| 36 | 113 | 161.4 | 6.7 | 8.9 | 27 | 35.9 |
| 34 | 106 | 151.1 | 6.3 | 9.5 | 27 | 36.5 |
| 32 | 100 | 143. | 5.9 | 10.2 | 27 | 37.2 |
| 30 | 94.2 | 132. | 5.6 | 10.7 | 27 | 37.9 |
| 28 | 87.9 | 125.5 | 5.2 | 11.5 | 27 | 38.5 |
| 26 | 81.6 | 116.5 | 4.8 | 12.7 | 27 | 39.7 |
| 24 | 75.3 | 107.5 | 4.4 | 13.6 | 27 | 40.6 |
| 22 | 69. | 98.5 | 4.1 | 14.6 | 27 | 41.6 |
| 20 | 62.8 | 89.7 | 3.7 | 16.2 | 27 | 43.2 |
| 18 | 56.5 | 80. | 3.3 | 18.1 | 27 | 45.1 |
| 16 | 50.2 | 71.7 | 2.9 | 20.8 | 27 | 47.8 |
| 14 | 43.9 | 62.4 | 2.6 | 23. | 27 | 50. |
| 12 | 37.6 | 55.7 | 2.2 | 27.7 | 27 | |

Accordingly, the individual speed of the motors at the start will be for a 36 cm diameter film roll 8.9+27, for a 35 cm diameter film roll 10.7+27, etc.

On the speed control device 24, on a scale, it can be shown the total speed for the different size films so that the total speed can be set right away for the film in use, reading it from the chart above.

By setting the total speed of the motors according to the diameter of the film rolls, the film between the two reels will be driven with a uniform speed without the help of the metal rollers, but they help also to keep the necessary speed of the film.

The metal rollers are necessary for the synchronization of the motion of a film without perforations with the rotation of the prism. Metal rollers 21 and 22 are connected through gear train 22a, and are coupled with rubber rollers 26, 26a, 27, 28, and 29. Metal roller 21 is driven by motor 27b through shaft 27c.

When in operation, the speed of metal roller 21 has to be set by speed control device 27a so that it should drive the film with a 24 picture frame speed per second. Metal rollers 21 and 22 rotate in the same direction controlling the film before and after the sound drum 23. The circumference of the metal rollers has to be the multiple pair number of the height of one picture section of the film to make possible the synchronization between the rotation of the metal rollers with the rotation of the prism 19. For instance, if the faces of the prism in use are 8, then the circumference of the metal rollers has to be 8 times the height of one picture section of the film. The ratio in this case between the rotation of the prism and the rotation of the metal rollers would be 1:1. Metal rollers 21 and 22 are replacing in this case actually the sprockets and eliminate the driving of the film through perforations in the film.

To regulate the speed of the reels, and the tension in the film, two stress control devices are installed which comprise rollers 31c, 31a, 31b, arm 31d, rheostat or speed control device 31. Speed control device 31 is connected thorugh conductor 40 and 41 before and after the motor 2 with electric circuit 23a, consequently, when speed control device 31 is turned on to its lowest resistance, as shown in the drawing, the motor 2 is completely de-energized.

When speed control device 31 is turned higher, motor 2 is activated again. Rollers 31a and 31b are fastened on arm 31d, which is serving as the arm of the speed control device 31 and is forced by a spring 62 toward the lowest resistance in the device. The film 9 is wound around rollers 31a, 31b, and 31c so that when the stress in the film is greater the film will move the arm 31d of the speed control device 31 toward his dashed position by raising the position of roller 31a upward which, in turn, by its arm is fixedly connected with arm 31d, resulting in the dashed position of the film and thereby reducing the circulation of the electric current in conductors 40 and 41 activating thereby motor 2, which drives the supply reel, loosens the stress in the film, and the procedure starts again. The arm of the speed control device will find its optimal position. This means the stress will be steady and uniform in the film and the stress control device will keep this way always under control the tension in the film and the speed of the supply reel motor. The amount of stress in the film can be set by the force of the spring which forces the arm 31d toward the film. When the film has to be rewound, the stress control device between the supply reel 6 and projection window 25 has to be deactivated through a switch and the second stress control device, which is placed between the second metal roller 22 and the take up reel 7 and including rollers 47, 45, 45a and speed control device 42, has to be activated and the procedure will be the same as before, only reversed. Parts of the stress control device are shown in FIG. 2.

It is understandable that instead of the gear train connection between the two metal rollers, a timing belt can be used also.

With the back and forth adjustment of roller 15, the picture can be placed in the right relation with the prism in the projection system.

FIG. 2 shows in detail the synchronization between the motion of a film without perforation and the prism of the projector system. Film 9 is wound around metal roller 21 and pressed against it by rubber rollers 26 and 27. Sprocket 34a is tightly connected to metal roller 21. Prism 19 is tightly connected with sprocket 34b. Sprockets 34b and 34a are connected through a timing belt. The circumference of the metal roller must be the multiple number of the height of one picture frame of the film. The height of the faces of the prism has to be equal to the height of one picture frame. The ratio of the synchronization between the film and the prism is determined by the relation between the circumference of the film and the number of faces of the prism.

FIG. 3 shows the synchronization between the motion of a film with perforations and the prism of the projector system. Film 9 is wound around and drives sprocket 45 through the teeth which fit into the perforations. Sprocket 46a is tightly connected with sprocket 45 which drives through timing belt 49, sprocket 46b and prism 19. The ratio of synchronization is determined by the number of teeth in sprocket 45 and the number of the faces of the prism 19.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A motion picture apparatus comprising a supply reel and a take-up reel, a first reversible variable-speed gear-reduced motor for driving said supply reel, a second identical variable speed motor for driving said take-up reel, circuit means for connecting said first and second motors in series with a source of electric current for energizing said motors for rotation in the same direction and including variable means for controlling the speed of said motors, a film gate located along a film path between said supply reel and said take-up reel, a first sensing roller located between said supply reel and said film gate for sensing the tension in a film passing along said film path, a first rheostat connected in parallel circuit with said first motor, means connecting said first sensing roller with said first rheostat for varying the adjustment of said first rheostat in response to a variation in the tension sensed by said first sensing roller, a second rheostat connected in parallel circuit with said second motor, a second sensing roller located between said film gate and said take-up reel for sensing tension in said film, means connecting said second sensing roller to said second rheostat for varying the adjustment of said second rheostat in response to a variation in the tension sensed by said second sensing roller, first and second drive rollers located between said film gate and second sensing roller, the diameter of said drive rollers being an integral multiple of the height of one picture frame, a third variable speed motor for driving said first and second drive rollers at the same speed, a sound drum between said first and second drive rollers, an optical compensating prism rotatably mounted on the optical axis in front of said film gate, a timing belt connecting said first drive roller with said optical compensating prism such that said prism will rotate one facet past said film gate in synchronousm with the driving of one film frame past said film gate by said first drive roller, and third rheostat means for manually adjusting the speed of said third motor.

* * * * *